United States Patent
Grider et al.

(10) Patent No.: US 9,789,783 B2
(45) Date of Patent: Oct. 17, 2017

(54) HYBRID/ELECTRIC VEHICLE CHARGE PORT DOOR

(71) Applicant: FORD GLOBAL TECHNOLOGIES, LLC, Dearborn, MI (US)

(72) Inventors: Duane M. Grider, Farmington Hills, MI (US); Zachary S. Underwood, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/073,733

(22) Filed: Mar. 18, 2016

(65) Prior Publication Data

US 2017/0267117 A1    Sep. 21, 2017

(51) Int. Cl.
  *H02J 7/00* (2006.01)
  *B60L 11/18* (2006.01)

(52) U.S. Cl.
  CPC ....... *B60L 11/1861* (2013.01); *B60L 11/1816* (2013.01); *H02J 7/0047* (2013.01); *H02J 2007/005* (2013.01)

(58) Field of Classification Search
  CPC .............. B60L 11/1861; B60L 11/1816; B60L 11/1851; H02J 7/0047; H02J 7/1461; G01R 31/006; B60R 25/1018
  USPC ....................................................... 340/455
  See application file for complete search history.

(56) References Cited

U.S. PATENT DOCUMENTS

| | | | |
|---|---|---|---|
| 6,536,928 B1 * | 3/2003 | Hein | B60Q 1/323 116/28.1 |
| 8,134,334 B2 * | 3/2012 | Suzuki | B60Q 1/2661 320/107 |
| 8,179,245 B2 * | 5/2012 | Chander | B60L 11/1818 340/455 |
| 2010/0246198 A1 * | 9/2010 | Hook | B60L 11/1818 362/459 |
| 2011/0084819 A1 * | 4/2011 | Bergum | H01M 10/48 340/425.5 |
| 2015/0217683 A1 * | 8/2015 | Salter | B60Q 3/022 362/510 |
| 2015/0298569 A1 * | 10/2015 | Kosetsu | B60L 3/12 320/155 |
| 2016/0001656 A1 * | 1/2016 | Korenaga | H01M 10/4207 701/22 |
| 2016/0181839 A1 * | 6/2016 | Racine | H02J 7/0093 320/107 |

FOREIGN PATENT DOCUMENTS

| | | |
|---|---|---|
| CN | 203283109 U | 11/2013 |
| DE | 102011114075 A1 | 6/2012 |
| DE | 102012009018 A1 | 11/2013 |
| WO | 2012130207 A2 | 10/2012 |

* cited by examiner

*Primary Examiner* — Joseph Feild
*Assistant Examiner* — Omar Casillashernandez
(74) *Attorney, Agent, or Firm* — David B. Kelley; Brooks Kushman P.C.

(57) ABSTRACT

A battery charge display system includes a display assembly attached to a cover of a charge port, and a controller. The display assembly having a first indicator coupled to a first surface of the cover and a second indicator coupled to a second surface of the cover. The controller is configured to, in response to the cover being in an open position after vehicle deactivation, illuminate the display assembly such that the first and second indicators display a battery state of charge.

20 Claims, 2 Drawing Sheets

HYBRID/ELECTRIC VEHICLE CHARGE PORT DOOR

TECHNICAL FIELD

The present disclosure relates to electric, hybrid-electric, and plug-in vehicles.

BACKGROUND

Plug-in vehicles, such as plug-in hybrid electric vehicles and plug-in electric vehicles, may include a rechargeable power source, such as a battery, that is configured to accept electrical power from a power source located externally to the vehicle. Such external power sources may include standard household electric outlets, external chargers or charging stations.

SUMMARY

A charge port for a vehicle includes a cover having first and second surfaces, a display assembly and a controller. The display assembly has a first indicator coupled with the first surface and a second indicator coupled with the second surface. The controller is configured to, in response to the cover defining an open position, illuminate the indicators to display a state of charge of a battery of the vehicle on the first and second surfaces.

A vehicle includes a charge port, a cover, a display assembly and a controller. The charge port is configured to attach to a charge cable to charge a battery. The cover defines first and second surfaces and is rotatably attached to the charge port such that the cover defines a closed state when the second surface is parallel to the charge port and an open state otherwise. The display assembly is attached to the cover and has a first indicator coupled to the first surface and a second indicator coupled to the second surface. The controller is configured to activate the display assembly such that in the open state, a current state of charge of the battery is displayed on the first and second surfaces via the first and second indicators, and in the closed state a current state of charge of the battery is displayed on the first surface via the first indicator.

A battery charge display system includes a display assembly attached to a cover of a charge port, and a controller. The display assembly having a first indicator coupled to a first surface of the cover and a second indicator coupled to a second surface of the cover. The controller is configured to, in response to the cover defining an open position after vehicle deactivation, illuminate the display assembly such that the first and second indicators display a battery state of charge.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
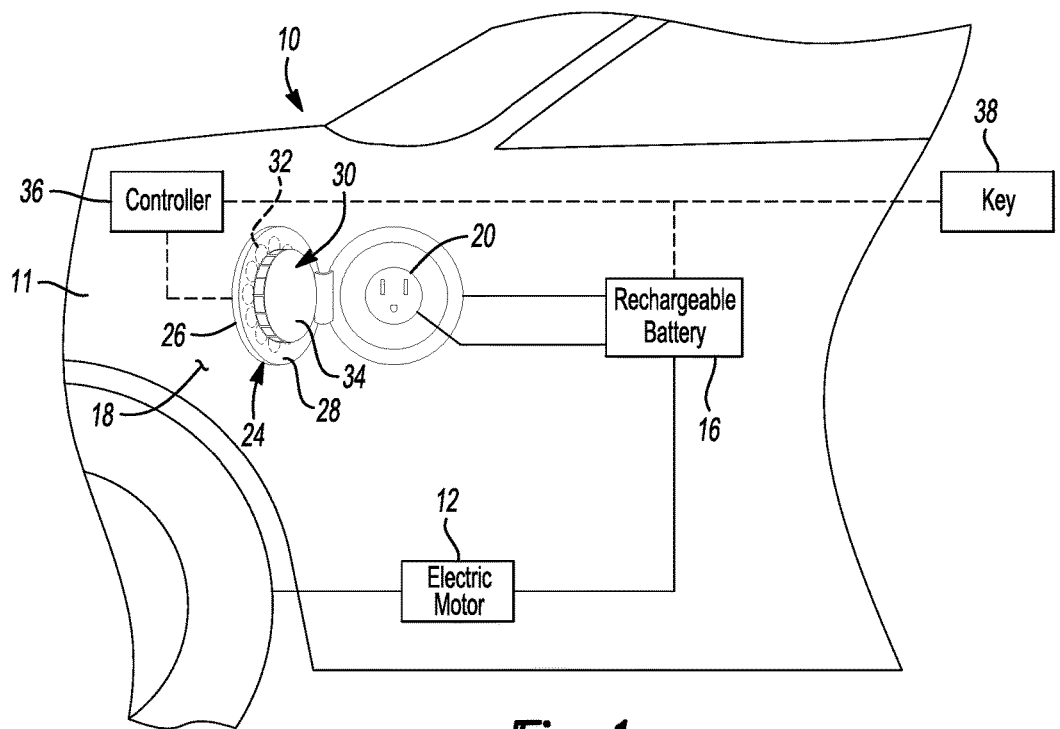
FIG. 1 is schematic view of a vehicle.

With respect to FIG. 1, a schematic side view of a vehicle 10 is illustrated. The vehicle 10 may be any type of automobile including, but not limited to, sedans, coupes, SUVs, CUVs, pickup trucks, minivans, full size vans, commercial vehicles, convertibles, recreation vehicles, all-terrain vehicles, golf carts, neighborhood electric vehicles, battery electrical vehicles and fuel cell vehicles and buses. The vehicle 10 includes a vehicle body 11 and a propulsion unit, which in this embodiment is an electric motor 12 configured to deliver torque to front wheels 14. In other embodiments, torque may be delivered to rear wheels or to all wheels on the vehicle, and other types of propulsion units may be used. The electric motor 12 receives electrical power from a battery 16 which is configured to store electrical energy supplied by a source external to the vehicle 10. In some embodiments of the vehicle 10, an internal combustion engine (not shown) is connected to vehicle body 11 and configured to deliver torque to wheels such as front wheels 14 to assist the electric motor 12 in propelling the vehicle 10. In other embodiments, the internal combustion engine may also be configured to recharge the battery 16. In still other embodiments, the internal combustion engine's sole duty may be to recharge the battery 16.

The overall life of a rechargeable the battery is dependent upon the number of full discharges and recharges the battery undergoes. The microprocessor, computer or other computing device (not shown) may be programmed with an algorithm that calculates whether the battery 16 should be recharged in a manner that optimizes the life of the battery 16. In other embodiments, the vehicle 10 may record a particular driver's driving habits and duration of vehicle operation to calculate how often the battery 16 should be recharged to maximize the life of the battery 16 in view of that particular driver's driving habits and patterns.

Vehicle body 11 includes an outer panel 18. A recharging port 20 is supported on the outer panel 18. In the illustrated embodiment, the recharging port 20 is configured to engage a standard three-hole plug of an electrical extension cord and is further configured to receive a charge from a standard household electrical outlet rated at approximately 120 volts or from an external charger or a charging station. In other embodiments, a unique plug dedicated to the recharging of plug-in vehicles may be employed. In still other embodiments, the recharging port may be configured to receive an electric charge from electrical outlets providing power at approximately 240 volts, or at other voltages. Thus, the connector configuration can consist of straight pins, it can be a twist-lock type, an SAE or other configuration. The recharging port 20 is connected to the battery 16 via a recharging cable 22 that is configured to deliver electrical power from the recharging port 20 to the battery 16. The recharging port 20 may also be configured to detect the presence of a plug or other device engaged with the recharging port 20.

A cover member 24 is hingedly connected to the outer panel 18 and configured to move between an open position and a closed position. The cover member 24 has a first surface 26 and a second surface 28. The cover member 24 also includes a display subassembly 30. The display subassembly 30 has a first indicator 32 coupled with the first surface 26 and a second indicator 34 coupled with the second surface 28. The first and second indicators 32, 34 are further coupled to the battery 16 and are configured to display, via the display subassembly 30, a state of charge of the battery 16 on the cover member 24. In at least one other embodiment the state of charge of the battery 16 includes, but is not limited to a time to full charge, a time remaining before charge, a scheduled charge time, as well as an error in the charge connection and system charge errors. Likewise, the display subassembly 30, via the first and second indicators 32, 34, may display any combination of the states of charge.

The display subassembly 30 communicates with a controller 36 to relay the state of charge of the battery 16 to the first and second indicators 32, 34. Coupling the first indicator 32 with the first surface 26 and the second indicator 34 with the second surface 28, the state of charge of the battery 16 may be visible when the cover member 24 is in either the open or closed position. The display subassembly 30 may be attached to the cover member 24 using adhesives, fasteners, or any other attachment member to allow the first indicator 32 to be coupled with the first surface 26 and the second indicator 34 to be coupled with the second surface 28.

When in the open position, the state of charge of the battery 16 may be displayed using the first indicator 32 and the second indicator 34. Likewise, when in the closed position, the state of charge of the battery 16 may be displayed using the first indicator 32. Other embodiments may vary display of the state of charge of the battery 16 on either the first indicator 32 or the second indicator 34 depending on the position of the cover member 24. For example, the display subassembly 30 may only indicate the state of charge the battery 16 on the first indicator 32 when the cover member 24 is in the closed position to save charge. Likewise, the display subassembly 30 may only indicate the state of charge of the battery 16 on the second indicator 34 when the cover member 24 is in the open position to save charge.

In at least one other embodiment, the controller 36 may be configured to detect the presence of a key 38. The controller 36 may communicate with the key 38 via near field communication, Bluetooth, Wi-Fi, or any other wireless communication means. The controller 36 may be configured to activate the display subassembly 30 if the key 38 is within range of the controller 36. As will be discussed in more detail below, if the key 38 is in range of the controller 36, the controller 36 may activate the display subassembly 30 to display the state of charge of the battery 16. Further, the controller 36 may activate the display subassembly 30 to display the state of charge of the battery 16 if a door unlocked command is received from the key 38. When the controller 36 activates the display subassembly 30, the first and second indicators 32, 34 may indicate the state of charge of the battery 16.

Figure 2:
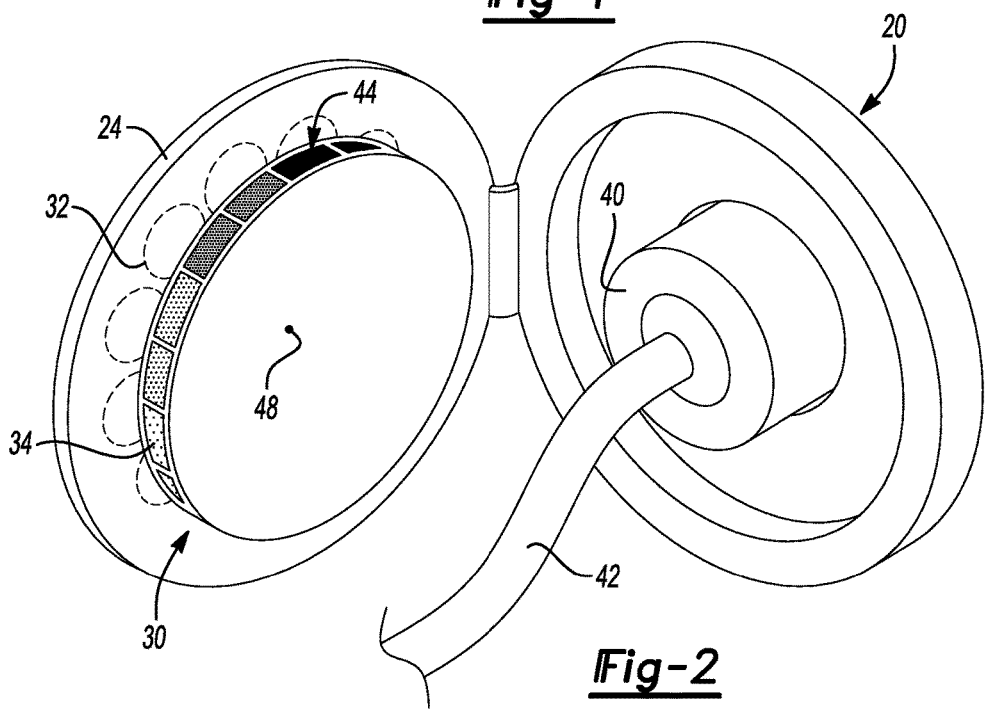
FIG. 2 is a perspective view of a vehicle charge port.

With respect to FIG. 2, an expanded view is presented of the recharging port 20, the display subassembly 30 and the cover member 24. As depicted in FIG. 2, a plug 40 of a charge cord assembly, such as an extension cord assembly 42, is engaged with the recharging port 20. An opposite end (not shown) of extension cord assembly 42 is attached to a household electrical outlet and electrical power is flowing into the recharging port 20. The display assembly 30 may also be configured to indicate when the battery 16 is charging. For example, when the recharging port 20 is receiving electrical power through extension cord assembly 42 and the battery 16 is receiving a charge, the display assembly 30 may be configured to illuminate, for instance, green, to indicate that the battery 16 is receiving a charge. Likewise, the display assembly 30 may be configured to illuminate, for instance red, to indicate that the battery 16 is not receiving charge or, for instance yellow, to indicate that the extension cord assembly 42 is not connected to the recharging port 20.

As stated above, the display assembly 30 can indicate the current state of charge of the battery 16. For example, the display subassembly 30 may use a plurality of lights 44 if the first indicator 32 and the second indicator 34. In the illustrated embodiment, the display assembly 30 is configured to illuminate a portion of the lights 44 in an arc, as indicated by the first indicator 32 the length of which correlates to the percentage of charge of the battery 16. Likewise, the display assembly 30 is configured to illuminate a portion of the lights 44 in a line, as indicated by the second indicator 34, the length of which correlates to the percentage of charge of the battery 16. Further, the first indicator 32 may represent state of charge the battery 16 by a line and the second indicator 34 may represent state of charge the battery 16 by an arc. The greater the number of lights that are illuminated, the closer to completion the recharging process is. Illumination of the lights 44 may also vary in color. For example, when the state of charge the battery 16 is low, the lights 44 may illuminate in red. As completion of the recharging process pursues, the lights 44 may also illuminate in yellow and green.

The display assembly 30 may also employ flash patterns in conjunction with illumination of the lights 44 to indicate the state of charge the battery 16. For example, when the state of charge of the battery 16 is low, the lights 44 may blink rapidly in red and as the recharging process pursues, the lights 44 may follow a slowed blinking pattern in yellow. Once the recharging process is complete, the lights 44 may be illuminated as a solid color in green.

The display assembly 30 may be further configured to communicate the occurrence of a fault during the recharging process. For example, the display assembly 30 may be configured to illuminate each of the lights 44 in blue to indicate that although plug 46 is engaged with the recharging port 20, electrical power is not flowing to battery 16. In other embodiments, rather than illuminating the lights 44 in blue when a fault is detected, the display assembly 30 may be configured to blink the lights 44 on and off in orange to alert the user of a fault. In still other embodiments, when a fault is detected, the lights 44 may flash on and off in blue. In other embodiments, other colors and flash patterns may be employed for both the recharging process and fault detection.

In addition to illuminating, the display assembly 30, via the first indicator 32 and the second indicator 34, may be configured to emit an audible signal such as, but not limited to, a siren or a chime. The display assembly 30 may be further configured to provide information to a user about the state of charge of the vehicle using such audible signals. For instance, when a user plugs an external electric power source into the recharging port 20 and the battery 16 begins to receive a charge, the display assembly 30 may be configured to emit a chime or other audible signal through the first and second indicators 32, 34 to alert the user that recharging is underway. In circumstances where a fault is detected and the battery 16 is not receiving a charge after engaging the recharging port 20 with an external power source, the display assembly 30 may be configured to emit a second audible signal such as a siren or a buzz or some other signal to alert the user of the fault. The audible signals may be emitted by the display assembly 30 in addition to, or instead of, the illumination described above.

The display assembly 30 may also be configured to illuminate lights 44 solely for the purpose of illuminating the recharging port 20. Further, an external light 48 may also be attached to the display subassembly 30. The external light 48 may be illuminated simultaneously with the first indicator 32 and the second indicator 34, or independently of the first indicator 32 and the second indicator 34. The external light 48, when used simultaneously with the first and second indicators 32, 34, may employ flash pattern or color scheme to indicate an interval of the recharging process. For example, the external light 48 may illuminate red when the state of charge of the battery 16 is low and progress to yellow and green as the state of charge the battery 16 increases and completes. Further, if the lights 44 used by the first indicator 32 and the second indicator 34 invoke a color scheme, the external light 48 may provide a flash pattern to indicate the interval of the recharging process. For example, the external light 48 may blink rapidly when the state of charge of the battery 16 is low and reduce the blinking frequency as the recharging process increases and completes. When used independently of the first indicator 32 and the second indicator 34, the external light 48 may solely provide illumination of the recharging port 20. The display assembly 30 may be configured to illuminate the lights 44 of the first and second indicators 32, 34 in the manner discussed above to convey information about the status of the battery 16 and other systems and circumstances relating thereto.

Figure 3:
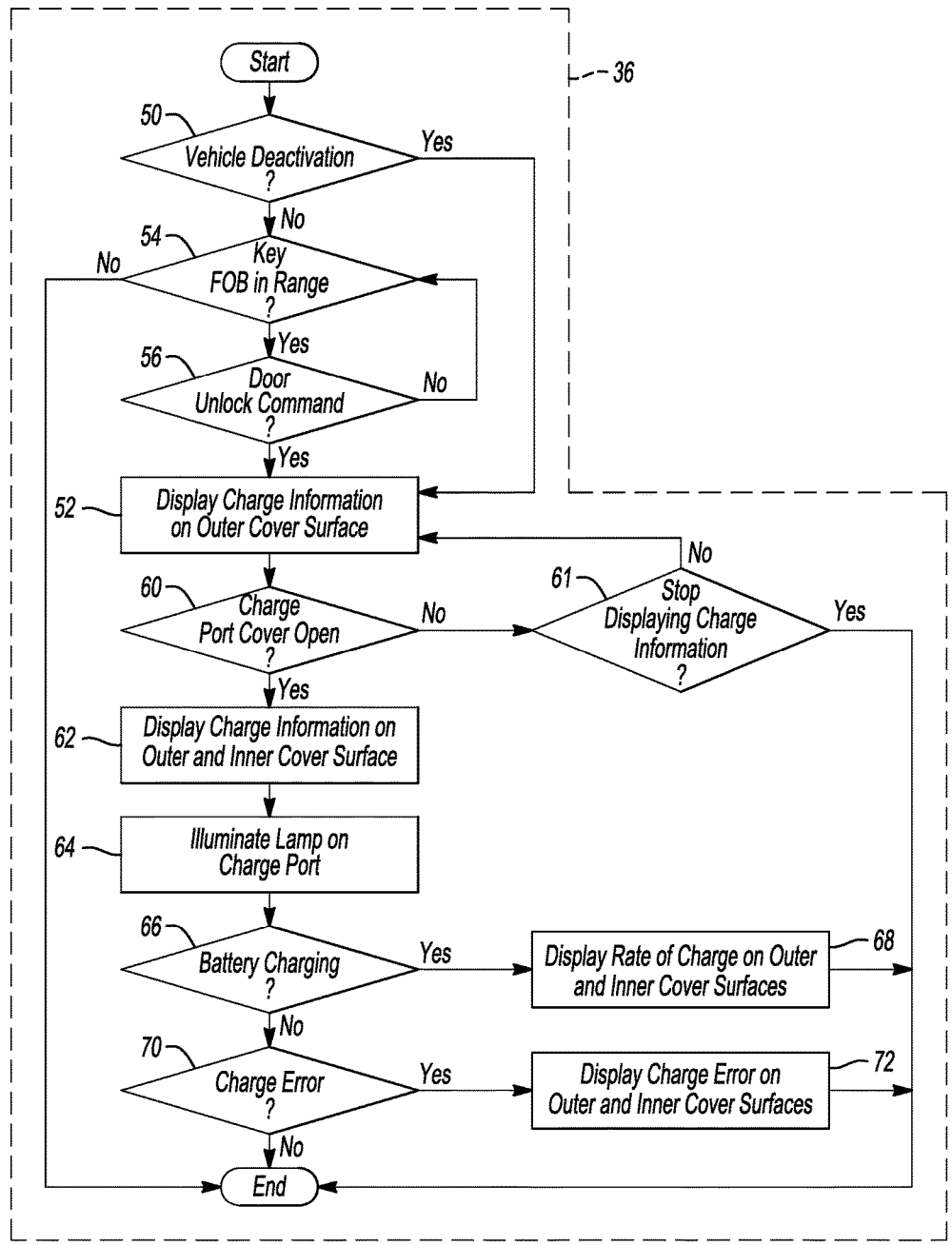
FIG. 3 is a control logic flow diagram for display of battery charge information on the charge port cover member.

Referring to FIG. 3, a control logic flow diagram for the controller 36 to activate the display subassembly 30 is depicted. At 50, the controller 36 determines if there has been a vehicle deactivation. The vehicle deactivation at 50 is consistent with the vehicle being turned off and a parked position. If at 50, the controller 36 determines there has been a vehicle deactivation, the controller 36 activates the display subassembly 30 to display the battery state of charge information on the first surface of the cover member at 52. If at 50 the controller 36 determines there has not been a vehicle deactivation, the controller 36 determines if the key 38 is within range at 54. If the controller 36 determines that the key is not within range at 54 the control logic ends. If however, the controller 36 determines the key is within range at 54, the controller 36 determines if there has been a door-unlock command at 56. If at 56 the controller 36 determines there has been a door-unlock command, the controller 36 activates the display subassembly 30 to display the state of charge of the battery using the first indicator 32 on the first surface 26 of the cover member 24 at 52. If at 56 the controller 36 determines there has not been a door-unlock command, the controller continues to check if the key is within range at 54.

At 60, the controller 36 determines if the cover member is in the open position. If at 60, the controller 36 determines the cover member is in the closed position, the controller 36 determines if the display subassembly 30 is active at 61. If at 61, the controller determines that the display subassembly 30 is not active the control logic ends. If, at 61, the controller 36 determines that the display subassembly 30 is active, the state of charge of the battery is displayed on the first surface 26 of the cover member 24 using the first indicator at 52. If at 60, the controller 36 determines the cover member 24 is in the open position, the controller 36 activates the display subassembly 30 to provide the state of charge of the battery using the first and second indicators on the first and second surfaces 26, 28 of the cover member at 62. At 64, the controller 36 activates the display subassembly 30 to illuminate the external light 48, or lamp to illuminate the recharging port as described above. At 66, the controller 36 determines if the battery is charging.

If at 66, the controller 36 determines that the battery is charging, the controller 36 activates the display subassembly 30 to provide state of charge of the battery using the first and second indicators 32, 34 on the first and second surfaces 26, 28 of the cover member at 68. If at 66, the controller 36 determines if the battery is not charging, the controller 36 determines if there has been a charge error or fault at 70. If at 70 the controller 36 determines that there has been a charge error, the controller 36 activates the display subassembly 30 to indicate the charge error using the first and second indicators 32, 34 on the first and second surfaces 26, 28 of the cover member at 72. If at 70, the controller 36 determines that there has not been a charge error, the control logic ends.

While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A charge port for a vehicle comprising:
 a cover having first and second surfaces;
 a display assembly having a first indicator disposed on the first surface and a second indicator disposed on the second surface; and
 a controller configured to, in response to the cover being in an open position, illuminate the indicators to display a state of charge of a battery of the vehicle on the first and second surfaces.

2. The charge port of claim 1 further comprising a light source disposed between the first and second surfaces and configured to illuminate the first indicator and the second indicator such that the indicators display the state of charge of the battery.

3. The charge port of claim 1 further comprising a light source disposed between the first and second surfaces and configured to illuminate the first indicator such that the first indicator displays the state of the charge of the battery.

4. The charge port of claim 1 further comprising a light source disposed between the first and second surfaces and configured to illuminate the second indicator such that the second indicator displays the state of charge of the battery.

5. The charge port of claim 1, wherein the first and second indicators include a plurality of lights arranged such that illumination of the plurality of lights provides an indication of the state of charge of the battery.

6. The charge port of claim 1, wherein the first and second indicators include a lamp configured to digitally display the state of charge of the battery using alpha-numeric characters.

7. The charge port of claim 1, wherein the controller is further configured to, in response to the cover being in a closed position, illuminate the first indicator to display a state of charge of the battery on the first surface.

8. A vehicle comprising:
   a charge port configured to attach to a charge cable to charge a battery;
   a cover defining first and second surfaces, rotatably attached to the charge port such that the cover is in a closed state when the second surface is parallel to the charge port and an open state otherwise;
   a display assembly attached to the cover and having a first indicator disposed on the first surface and a second indicator disposed on the second surface; and
   a controller configured to activate the display assembly such that in the open state, a current state of charge of the battery is displayed on the first and second surfaces via the first and second indicators, and in the closed state a current state of charge of the battery is displayed on the first surface via the first indicator.

9. The vehicle of claim 8, wherein the controller is further configured to illuminate a lamp disposed within the charge port to display the current state of charge of the battery on the second surface of the cover.

10. The vehicle of claim 8, wherein the controller is further configured to activate the display assembly to display a time to full battery charge on the first and second surfaces of the cover, via the first and second indicators, when in the open state.

11. The vehicle of claim 8, wherein the controller is further configured to activate the display assembly to display a time remaining until full battery charge on the first and second surfaces of the cover, via the first and second indicators, when in the open state.

12. The vehicle of claim 8, wherein the controller is further configured to activate the display assembly to display a scheduled charge time on the first and second surfaces of the cover, via the first and second indicators, when in the open state.

13. The vehicle of claim 8, wherein the controller is further configured to activate the display assembly to display an error state of the battery state of charge on the first and second surfaces of the cover, via the first and second indicators, when in the open state.

14. A battery charge display system comprising:
   a display assembly attached to a cover of a charge port, and having a first indicator disposed on a first surface of the cover and a second indicator disposed on a second surface of the cover; and
   a controller configured to, in response to the cover being in an open position after vehicle deactivation, illuminate the display assembly such that the first and second indicators display a battery state of charge.

15. The battery charge display system of claim 14, wherein the controller is further configured to, in response to the cover being in a closed position after vehicle deactivation, illuminate the display assembly such that the first indicator displays a battery state of charge.

16. The battery charge display system of claim 14, wherein the controller is further configured to, in response to the cover being in an open position after vehicle deactivation, activate the display assembly to display a battery state of charge such that the indicators display a time to full charge of the battery.

17. The battery charge display system of claim 14, wherein the controller is further configured to, in response to the cover being in an open position after vehicle deactivation, activate the display assembly to display a battery state of charge such that the indicators display a time remaining to full charge of the battery.

18. The battery charge display system of claim 14, wherein the controller is further configured to, in response to the cover being in an open position after vehicle deactivation, activate the display assembly to display a battery state of charge such that the indicators display a scheduled charge time of the battery.

19. The battery charge display system of claim 14, wherein the controller is further configured to, in response to the cover being in an open position after vehicle deactivation, activate the display assembly to display a battery state of charge such that the indicators display an error state.

20. The battery charge display system of claim 14, wherein the first and second indicators include a lamp configured to digitally display the state of charge of the battery using alpha-numeric characters.

* * * * *